2,952,903
HIGH TEMPERATURE COMPOSITION

Edward Washken, Cambridge, Mass., and Leslie A. Runton, Middle Haddam, and Henry C. Morton, Branford, Conn. (The Russell Manufacturing Company, Middletown, Conn.)

No Drawing. Filed Nov. 12, 1957, Ser. No. 695,514

1 Claim. (Cl. 29—182.5)

This invention relates to a composition which is resistant to ultra high temperatures and more particularly to a composition of the cermet class having a high thermal resistance.

An object is to provide a material which is capable of withstanding ultra high temperatures for short periods of time.

A more specific object is to provide a novel and improved cermet composition which is particularly adapted for use in nose cones for guided missiles, throats for rocket motors—rocket exhaust systems, steering vanes for missiles, seals for rocket fuel pumps, support for high temperature filament in inert gases, vacuum tubes, and mercury rectifier tubes.

A feature of the improved composition is its ability to vaporize at high temperatures without passing through the liquid phase and to form a vapor blanket around the object which shields the object from the surrounding high temperatures. In vaporizing heat is extracted from the material which exerts an additional cooling effect and retards the progressive surface degradation. The decomposition of the material is thus retarded to such an extent that the material can withstand the ultra high temperature produced in an intercontinental ballistic missile nose cone where ultra high temperature may be developed for a period of one-half minute duration when the missile reenters the atmosphere at very high speed. Of course the composition is also useful for purposes where less drastic conditions are encountered as in the examples above enumerated.

In accordance with the present invention a cermet composition is made by sintering a blended powder composed of periclase (magnesium oxide), tungsten and nickel. The sintered particles are bonded together but do not lose their identity as would be the case if an alloy were produced. Some incomplete alloying may result.

In this cermet the nickel and tungsten serve as binders. When subjected to high temperatures in an oxidizing atmosphere the tungsten oxidizes to tungstic oxide. Both tungstic oxide and magnesium oxide are volatile and thus vaporize without passing through the liquid phase to form a layer of protective vapor around the cermet. In addition the oxides extract heat from the cermet in vaporizing, thereby further retarding the rate of heat transfer from the surrounding medium. This action is progressive from the surface of the cermet to the interior and proceeds at a rate that can be controlled by varying the relative proportions of the components.

In general a high magnesium oxide content imparts a high degree of thermal resistance with a minimum weight. If weight is of less importance a high tungsten content is preferable as the oxidation and vaporization of the tungsten provides the major heat retarding characteristics. On the other hand, a higher nickel content increases the mechanical strength of the cermet and is to be preferred if the material constitutes a structural element which must withstand stress.

The following examples are illustrative:

Example 1

A blend composed of 90% periclase, 9% tungsten, and 1% nickel is passed through a 100-mesh screen, compacted at a pressure of 30 tons per square inch and sintered in an atmosphere of dissociated ammonia at a temperature of 2300° F. for about one hour.

The resulting cermet has the properties enumerated above and is of relatively light weight due to the high content of magnesium oxide.

Example 2

A cermet is made by the same procedure having 6% magnesium oxide, 90% tungsten and 4% nickel. This product is somewhat heavier due to the high tungsten content but possesses a high thermal resistance.

Example 3

A cermet containing 20% magnesium oxide, 48% tungsten and 32% nickel is made as in Example 1. This composition has a high mechanical strength due to the higher nickel content but somewhat lower thermal resistance. It is suitable for uses where a sustained high temperature is encountered as in the filament supports above mentioned.

These examples illustrate the maximum and minimum percentages of the various components which are usually effective. Obviously the particular percentages selected within these ranges will depend upon the characteristics required in the final product. A composition suitable for use as a nose cone for a ballistic missile may be as follows:

Example 4

22% magnesium oxide, 70% tungsten, 8% nickel sintered as in Example 1.

For ease of fabrication the powder may be pressed or molded into the shape of the final article before sintering so that the machining will be reduced to a minimum.

What is claimed is:

A cermet composition having high thermal resistance consisting essentially of a blend composed of discrete particles of magnesium oxide, tungsten and nickel in compacted form, said particles being surface bonded only to form a rigid mass whereby their identity is maintained, said materials having about the following proportions:

| | Percent |
|---|---|
| Magnesium oxide | 22 |
| Tungsten | 70 |
| Nickel | 8 |

References Cited in the file of this patent

UNITED STATES PATENTS

| 2,656,596 | Conant et al. | Oct. 27, 1953 |
| 2,698,990 | Conant et al. | Jan. 11, 1955 |
| 2,789,341 | Youssov | Apr. 23, 1957 |
| 2,823,988 | Grant | Feb. 18, 1958 |

FOREIGN PATENTS

| 737,398 | Great Britain | Sept. 28, 1955 |